T. RIGBY & G. W. ANDREW.
WORKING OF BY-PRODUCT RECOVERY GAS PRODUCERS.
APPLICATION FILED MAY 7, 1914.
1,239,969.
Patented Sept. 11, 1917.
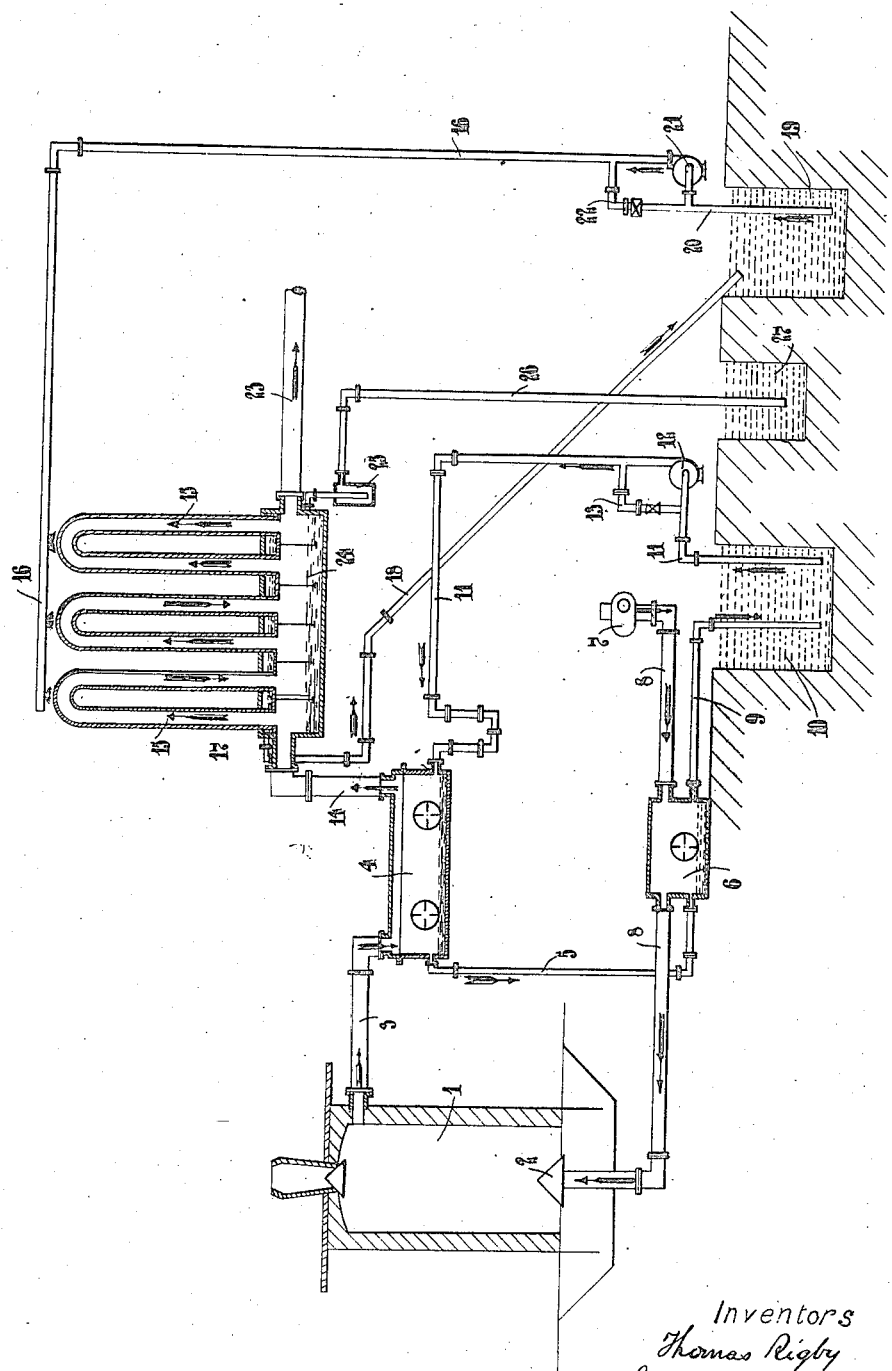
Inventors
Thomas Rigby
George William Andrew
by Byrnes Townsend Brickenstein
Attorneys.

UNITED STATES PATENT OFFICE.

THOMAS RIGBY AND GEORGE W. ANDREW, OF DUMFRIES, SCOTLAND, ASSIGNORS TO WETCARBONIZING LIMITED, OF LONDON, ENGLAND.

WORKING OF BY-PRODUCT-RECOVERY GAS-PRODUCERS.

1,239,969.  Specification of Letters Patent.  Patented Sept. 11, 1917.

Application filed May 7, 1914. Serial No. 837,067.

*To all whom it may concern:*

Be it known that we, THOMAS RIGBY and GEORGE WILLIAM ANDREW, subjects of the King of Great Britain and Ireland, and residing at 61 Loreburn street, Dumfries, Scotland, have invented certain new and useful Improvements in and Relating to the Working of By-Product-Recovery Gas-Producers, of which the following is a specification.

This invention relates to the recovery of volatile by-products such a methyl alcohol by cooling in appropriate surface condensers the gases evolved in the gasification of peat.

The present invention has for its object to modify the method of treatment of the gases evolved from gas producers using coal and worked for nitrogen recovery, as of the Mond type, in order to permit of the efficient recovery of such bodies when gasifying peat in producers of the type in question.

This invention consists broadly in effecting cooling of the by-product bearing gases by indirect contact, as has been proposed, but effecting it under such conditions of temperature and the like that the water vapor borne by the gases and the more volatile by-products are condensed out of the gases during this cooling by indirect contact, and the valuable by-products such as methyl alcohol so condensed are not, as in the usual systems of by-product recovery from Mond or other producers, lost by being taken up in the cooling water into direct contact with which the gases are usually passed.

In working by-product recovery gas producers of Mond and other types large quantities of steam are supplied to the producers, not only for the purpose of enriching the gas and limiting the temperature of combustion in the producer, but of providing an excess of steam with which uncombined nitrogen in the fuel can form a further quantity of ammonia. The greater part of this steam passes through the producer undecomposed and issues with the producer gas, from which it has subsequently to be separated before the gas can be properly consumed.

Usually such separation is effected by circulating a suitable liquid, such as water, in direct contact with the producer gas, for the purpose of cooling the latter and condensing the accompanying steam, the heat thus gained by the cooling liquid being then utilized by bringing the liquid into direct and intimate contact with the air supply on its way to the gas producers. In this way the warm cooling liquid is cooled by the air, and the latter saturated with water vapor, whereby a great part of the steam required for the gas producers is thus recovered.

As the cooling liquid is thus circulated continuously in a closed cycle between the gas cooling and air heating apparatus, the cooling of the gas is dependent upon the amount of heat and water vapor taken up by the air, with the result that in practice the temperature of the gas leaving the cooling apparatus is in the neighborhood of 66° C., and the gas passes away saturated with water vapor at the exit temperature of the cooling apparatus.

As a result of working a gas producer by this method, besides the usual tar and ammonia, a certain quantity of volatile by-products, for instance methyl alcohol when using peat fuel, is lost in the cooling liquid.

In the apparatus diagrammatically illustrated in the accompanying drawing the peat is supplied to a producer 1, to which a mixture of air and steam with the latter in excess is introduced through the cone 2. The resulting gas is taken off through a pipe 3 to a washer 4, wherein tar and other substances of high boiling point are condensed. This washer is cooled by water which on leaving is passed through a pipe 5 into a heater 6, through which a pump 7 connected by the pipe 8 forces air for the producer into direct contact with the water in the heater, which thereby preheats the air and saturates it with water vapor before it is admitted to the producer at 2. The water thus cooled flows through the pipe 9 to a sump 10, from which it is drawn up through a pipe 11 by a pump 12 provided with a by-pass 13, and thereupon returned to the washer 4.

According to this invention the pump 12 or by-pass 13 is so adjusted that the amount of water supplied to the washer 4 is just sufficient to cool the producer gases to a temperature of from 66° to 90° C. usually about 66° in order that methyl alcohol in particular shall not be condensed in the washer but shall pass through it with the gas. Such material is recovered by taking the gas through a pipe 14 to a surface condenser 15 cooled by water sprayed on the outside thereof from a pipe 16. This cooling water collects in a reservoir 17 surrounding the condenser, and passes therefrom through a pipe 18 to a sump 19, from which it is drawn up through a pipe 20 by a pump 21 provided with a by-pass 22, and thereupon returned by the pipe 16 to be again used for spraying the outside of the condenser 15. In this way the gas is cooled out of contact with the cooling liquid, and before leaving the system at 23 it is deprived of methyl alcohol and other valuable products of low boiling point, which as a result of condensation collect in the vessel 24, from which they pass off through a trap 25 and pipe 26 to a receiver 27.

If the product sought is insoluble in water non-volatile oil or other appropriate solvent from which the substances are afterward separated, for example by heating, can be used. The operation is preferably conducted in a continuous manner by circulation of the solvent, not only in contact with the producer gas, but also through the still or other recovery apparatus. This solvent may also be used in such a manner that not only are volatile by-products of the character already considered thus recovered in the solvent, but the remaining light tar oils or the greater part of them, which are still present in spite of the scrubbing and cooling processes, are also recovered by the same operation and thereafter abstracted from the circulating solvents in any suitable manner. This method of recovering products insoluble in water may be used in combination with any of the methods by which the soluble products are recovered.

Having now described our invention, what we claim as new and desire to secure by Letters Patent is:—

1. In the utilization of peat, gasifying the peat in the presence of undecomposed steam to facilitate the production of ammonia, cooling the gases so produced to a temperature of from 66° to 90° C. by contact with a liquid, utilizing the warmed liquid thus obtained to impart to the air the steam required for the gasification and further cooling the gases below a temperature of about 66° C. out of contact with the cooling liquid in order to facilitate recovery of methyl alcohol from the gases.

2. In the utilization of peat, gasifying the peat in the presence of undecomposed steam to facilitate the production of ammonia, cooling the gases so produced by a washing process to recover the heat of said steam, utilizing the liquid of said washing process for imparting to the air the steam for the gasification process and thereafter effecting further cooling of the gases in a surface condenser to obtain methyl alcohol and other substances.

In testimony whereof we have signed our names to this specification in the presence of two subscribing witnesses.

T. RIGBY.
G. W. ANDREW.

Witnesses:
BERTRAM H. MATTHEWS,
C. S. DEALTRY.